May 5, 1936.  J. C. McCUNE  2,039,732
FLUID PRESSURE BRAKE
Filed Oct. 8, 1931
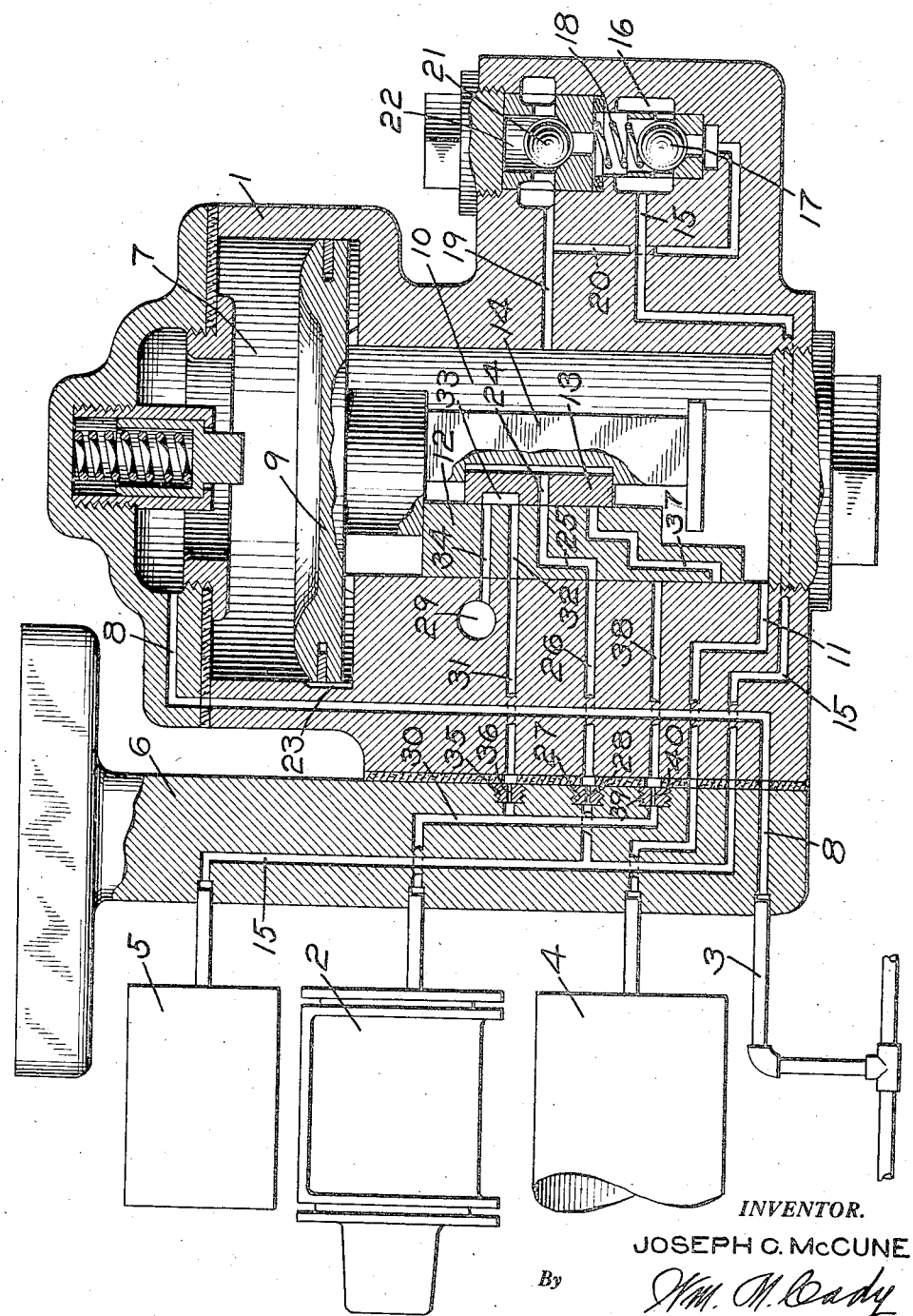
INVENTOR.
JOSEPH C. McCUNE
By *Wm. M. Cady*
ATTORNEY.

Patented May 5, 1936

2,039,732

UNITED STATES PATENT OFFICE 2,039,732

FLUID PRESSURE BRAKE

Joseph C. McCune, Edgewood, Pa., assignor to The Westinghouse Air Brake Company, Wilmerding, Pa., a corporation of Pennsylvania Application October 8, 1931, Serial No. 567,565

5 Claims. (Cl. 303—64)

This invention relates to fluid pressure brakes, and more particularly to an automatic fluid pressure brake equipment in which the brakes are applied by effecting a reduction in brake pipe pressure.

In the conventional brake equipment of the above type, the volumes of the auxiliary reservoir and the brake cylinder are so related that, with an eight inch brake cylinder piston travel, approximately three and one-quarter pounds brake cylinder pressure is developed for each pound reduction in brake pipe pressure.

This pressure ratio is satisfactory for the initial development of brake cylinder pressure, because the displacement of the brake cylinder piston must be compensated for, but this ratio is too high for any subsequent application of the brakes made before the brake cylinder pressure has been entirely released, because the brake cylinder piston displacement has already been compensated for by the initial brake application, so that in a subsequent brake application, the brake cylinder pressure builds up to an undesirable degree.

For example, because of the brake cylinder piston displacement, an initial reduction in brake pipe pressure of five pounds will result in a brake cylinder pressure of three and one-quarter pounds times five, minus fifteen, or one and one-quarter pounds. A subsequent brake pipe reduction of five pounds, however, while the brake cylinder piston is still in brake applied position, will result in a brake cylinder pressure of three and one-quarter times five or sixteen and one-quarter pounds pressure.

Assume that, in approaching a stop, the brakes have been applied, then graduated off, and then that a light reapplication of the brakes is made before the brake cylinder pressure is entirely released, so as to bring the train to a stop.

It is practically necessary to make a reduction in brake pipe pressure of not less than five pounds, in order to ensure that the triple valve pistons will be moved to brake application position, but this amount of reduction in brake pipe pressure results in a too heavy brake application, under certain conditions, with a consequent rough stop, because sixteen and one-quarter pounds pressure will be added to the pressure still present in the brake cylinder, when the subsequent brake application is made, and this condition is further aggravated, if the triple valves are equipped with a quick service means.

The above is also the case where a two application stop is effected, that is, a heavy initial application of the brakes, followed by a release of the brakes, and then a light application of the brakes, before the brake cylinder pressure has been completely released, and at a time when the speed of the train is slow.

The principal object of my invention is therefore to provide means for preventing an excessive build up of brake cylinder pressure upon an application of the brakes following an initial application of the brakes.

For accomplishing the above object, I propose to employ what may be termed a divided auxiliary reservoir volume, or two reservoirs, one of which may be designated as the auxiliary reservoir and the other the service reservoir. The combined volumes of the two reservoirs are made equal to the volume of the auxiliary reservoir of the conventional brake equipment. On the initial application of the brakes, the brake cylinder is supplied with fluid under pressure from both reservoirs, so that the pressure developed in the brake cylinder will correspond with the ratio of about three and one-quarter pounds for each pound reduction in brake pipe pressure.

In subsequent applications of the brakes, however, when made before the brake cylinder pressure has been completely released, only the volume of one reservoir is employed, so that the pressure developed in the brake cylinder upon such subsequent applications of the brakes will correspond substantially with the volume in one of the reservoirs, for example, the volume of the one reservoir may be such that only an increase in brake cylinder pressure of two pounds for each one pound reduction in brake pipe pressure will be obtained, as compared with the three and one-quarter pounds brake cylinder pressure obtained with the conventional brake equipment.

In the accompanying drawing, the single figure is a diagrammatic view of a car fluid pressure brake equipment embodying my invention and showing the triple valve device in section.

The equipment comprises a triple valve device 1, a brake cylinder 2, a brake pipe 3, an auxiliary reservoir 4, and a service reservoir 5, the triple valve device 1 being shown as applied to a pipe bracket 6, to which the above reservoirs, the brake cylinder, and the brake pipe are connected.

The triple valve device 1 comprises a casing having a piston chamber 7, connected through passage 8, with the brake pipe 3, and containing a piston 9, and having a valve chamber 10, connected through passage 11, with the auxiliary reservoir 4 and containing a main slide valve 12 and a graduating slide valve 13 mounted on and having a movement relative to the main slide valve, the valves being actuated in the usual manner by piston 9, through piston stem 14.

The service reservoir 5 is connected through a passage 15 with a valve chamber 16 which contains a ball check valve 17, urged to its seat by a spring 18. The check valve 17 controls a communication from the valve chamber 10 by way of passages 19 and 20 to the chamber 16. The chamber 16 also communicates with the valve chamber 10 by way of a check valve 21, contained in valve chamber 22, the chamber 22 being connected to valve chamber 10 through passage 19.

In operation, when the brake pipe is charged with fluid under pressure, fluid flows from the brake pipe, through passage 8 to triple valve piston chamber 7 and with the triple piston 9 in release position, as shown in the drawing, fluid flows from piston chamber 7, through the usual feed groove 23 around the piston, to valve chamber 10. From valve chamber 10, fluid flows through passage 11 to the auxiliary reservoir 4, charging said reservoir to brake pipe pressure.

Fluid under pressure also flows from valve chamber 10, through registering ports 24 in the graduating valve 13 and port 25 in the main valve 12 to passage 26, which passage communicates with passage 15, so that fluid under pressure is supplied to the service reservoir 5. A choke plug 27 having a restricted port 28 is placed in the passage 26, so that the reservoir 5 is charged with fluid at a restricted rate, as determined by the area of the port 28.

When the pressure in valve chamber 10 and the auxiliary reservoir 4 has been built up to a predetermined degree higher than the pressure in the service reservoir 5, as determined by the pressure of spring 18, for example, a differential pressure of ten pounds, the check valve 17 will unseat and permit a rapid flow of fluid from the valve chamber 10 to the service reservoir, by way of passage 19, passage 20, past check valve 17 to passage 15 and the service reservoir.

In release position, the brake cylinder 2 is connected to atmospheric exhaust port 29 through passage 30, passage 31, port 32 in slide valve 12, cavity 33 in graduating valve 13, and port 34 in slide valve 12, the passage 31 containing a choke plug 35 having a restricted flow port 36.

In order to effect a service application of the brakes, the brake pipe pressure is gradually reduced, and the triple piston 9 is thereby moved in the usual manner so as to first shift the graduating valve 13 to uncover the service port 37 in the main slide valve 12 and then move the main valve 12, so as to cause the service port 37 to register with the passage 38 which leads to brake cylinder passage 30. Fluid under pressure is then supplied from the valve chamber 10 and the auxiliary reservoir 4 and also from the service reservoir 5, by flow past the check valve 21, to the brake cylinder 2.

It will now be seen that in an initial application of the brakes, fluid under pressure will be supplied from both the auxiliary reservoir 4 and the service reservoir 5 to the brake cylinder, so that the ratio of the combined volumes of the two reservoirs to the brake cylinder volume determines the degree of brake cylinder pressure obtained per pound of brake pipe reduction.

When the auxiliary reservoir and service reservoir pressures have been reduced by flow to the brake cylinder to a degree slightly less than the reduced brake pipe pressure, the piston 9 is operated in the usual manner, to move the graduating valve 13, so as to lap the service port 37 and thus prevent the further flow of fluid under pressure to the brake cylinder.

In order to release the brakes, the brake pipe pressure is increased in the usual manner, causing the movement of the piston 9 to release position, in which the main valve 12 and the graduating valve 13 are positioned as shown in the drawing, so that fluid is released from the brake cylinder 2.

In release position, it is important to note that while the valve chamber 10 and the auxiliary reservoir 4 are recharged from the brake pipe 3 through the feed groove 23 at the same rate as in the conventional triple valve, the service reservoir 5 can only recharge at a restricted rate, as permitted through the restricted port 28, until the pressure in valve chamber 10 and the auxiliary reservoir 4 has been increased a predetermined amount over the pressure in the service reservoir 5, such as ten pounds, or sufficient to overcome the pressure of spring 18, at which time the check valve 17 is permitted to unseat, and allow flow from the valve chamber 10 to the service reservoir at a relatively unrestricted rate, until the pressure in the service reservoir 5 has again been increased to within ten pounds of the auxiliary reservoir pressure, when the check valve 17 will be seated and the further recharge of the service reservoir will take place through the restricted port 28.

In view of the initial recharging of the service reservoir at a slower rate than the auxiliary reservoir, when a light subsequent application of the brakes is made, if effected before the fluid in the brake cylinder has been completely released, fluid under pressure will only be supplied from the valve chamber 10 and the auxiliary reservoir 4 to the brake cylinder, since the pressure in the service reservoir 5 is less than the pressure in the auxiliary reservoir 4 and consequently fluid will not flow past the check valve 21 from the service reservoir 5 to the auxiliary reservoir.

As a consequence, on the subsequent brake application, the brake cylinder pressure will build up at the ratio as determined by the volume of the auxiliary reservoir 4 relative to the volume of the brake cylinder, such as, for example, a build up of two pounds for each pound reduction in brake pipe pressure, as compared with the usual build up of three and one-quarter pounds for each pound reduction in brake pipe pressure. When, however, the pressure in the auxiliary reservoir has been reduced by flow to the brake cylinder to substantially the pressure existing in the service reservoir, then further reduction by flow to the brake cylinder takes place from both the auxiliary reservoir and the service reservoir.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, brake cylinder, and a brake controlling valve device operated upon a reduction in brake pipe pressure for supplying fluid under pressure from said reservoir to the brake cylinder, of an additional reservoir, means for charging the auxiliary reservoir from the brake pipe at one rate and the additional reservoir at a more restricted rate, said additional reservoir having a communication through which fluid can flow from the additional reservoir to the auxiliary reservoir, and a check valve for preventing back flow through said communication from the auxiliary reservoir to the additional reservoir.

2. In a fluid pressure brake, the combination with a brake pipe, and a brake cylinder, of two reservoirs and a brake controlling valve device operated upon a reduction in brake pipe pressure for supplying fluid under pressure from both said reservoirs to the brake cylinder and upon an increase in brake pipe pressure for releasing fluid from the brake cylinder, and for recharging one of said reservoirs with fluid under pressure from the brake pipe, and means for recharging the other reservoir with fluid under pressure at a restricted rate and then at a more rapid rate when the pressure in the reservoir being charged from the brake pipe has been increased to a predetermined degree.

3. In a fluid pressure brake, the combination with a brake pipe and a brake cylinder, of an auxiliary reservoir, an additional reservoir, and a triple valve device comprising a piston and valve means operated by said piston upon a reduction in brake pipe pressure for supplying fluid under pressure from said reservoirs to the brake cylinder and upon an increase in brake pipe pressure for releasing fluid from the brake cylinder, said valve device having means for recharging the auxiliary reservoir from the brake pipe in releasing the brakes and for recharging the additional reservoir from the auxiliary reservoir and initially at a restricted rate through ports controlled by said valve means.

4. In a fluid pressure brake, the combination with a brake pipe and a brake cylinder, of an auxiliary reservoir, an additional reservoir, and a triple valve device comprising a piston and valve means operated by said piston upon a reduction in brake pipe pressure for supplying fluid under pressure from said reservoirs to the brake cylinder and upon an increase in brake pipe pressure for releasing fluid from the brake cylinder, said valve device having means for recharging the auxiliary reservoir from the brake pipe in releasing the brakes and the additional reservoir from the auxiliary reservoir through ports controlled by said valve means and at a restricted rate, and a loaded check valve for permitting flow from the auxiliary reservoir to the additional reservoir when the auxiliary reservoir pressure has been increased to within a predetermined degree of the pressure in the additional reservoir.

5. In a fluid pressure brake, the combination with a brake pipe and brake cylinder, of an auxiliary reservoir, an additional reservoir, and a triple valve device operated upon a reduction in brake pipe pressure for supplying fluid under pressure from both reservoirs to the brake cylinder and upon an increase in brake pipe pressure for releasing fluid from the brake cylinder and for recharging the auxiliary reservoir with fluid under pressure from the brake pipe, a check valve in a communication through which fluid is supplied from the additional reservoir to the auxiliary reservoir for preventing back flow from the auxiliary reservoir to the additional reservoir, and means for recharging the additional reservoir with fluid under pressure in releasing the brakes at a slower rate than the auxiliary reservoir is recharged, whereby upon a successive reduction in brake pipe pressure after an increase in brake pipe pressure, fluid under pressure is only supplied from the auxiliary reservoir to the brake cylinder.

JOSEPH C. McCUNE.